United States Patent
Dalrymple (10) Patent No.: US 7,605,918 B2
(45) Date of Patent: Oct. 20, 2009

(54) SPECTROMETER SIGNAL QUALITY IMPROVEMENT VIA EXPOSURE TIME OPTIMIZATION

(75) Inventor: David L. Dalrymple, Fredericktown, OH (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 343 days.

(21) Appl. No.: 11/713,204

(22) Filed: Mar. 2, 2007

(65) Prior Publication Data

US 2007/0216900 A1    Sep. 20, 2007

Related U.S. Application Data

(60) Provisional application No. 60/778,766, filed on Mar. 3, 2006, provisional application No. 60/781,256, filed on Mar. 10, 2006.

(51) Int. Cl.
 *G01J 3/02* (2006.01)
 *G01J 3/28* (2006.01)
(52) U.S. Cl. ............................... 356/326
(58) Field of Classification Search .......... 356/326, 356/328
See application file for complete search history.

(56) References Cited

U.S. PATENT DOCUMENTS

| | | | |
|---|---|---|---|
| 5,412,468 A | 5/1995 | Lundberg et al. | |
| 5,574,284 A | 11/1996 | Farr | |
| 6,571,118 B1 * | 5/2003 | Utzinger et al. | 600/476 |
| 6,974,973 B2 | 12/2005 | Rossi et al. | |
| 7,471,390 B2 * | 12/2008 | Deck et al. | 356/307 |
| 2004/0170215 A1 | 9/2004 | Rossi et al. | |

* cited by examiner

*Primary Examiner*—F. L Evans
(74) *Attorney, Agent, or Firm*—DeWitt Ross & Stevens; Michael C. Staggs

(57) ABSTRACT

A spectrometer operator may specify a desired signal to noise ratio (SNR) to be attained when collecting spectra from a sample. The SNR from a single brief sample exposure is used to determine the maximum exposure time achievable without overloading the spectrometer. If the desired SNR is greater than the SNR of an exposure using the maximum exposure time, multiple exposures can be taken at the maximum exposure time, and can be combined (e.g., averaged or summed) to obtain a spectrum having a SNR which at least approximates the one desired. If the desired SNR is less than the SNR of an exposure using the maximum exposure time, then only a single exposure is needed, and the exposure time can be scaled using the SNR from the single brief sample exposure to achieve a SNR which at least approximates the one desired.

19 Claims, 4 Drawing Sheets

SPECTROMETER SIGNAL QUALITY IMPROVEMENT VIA EXPOSURE TIME OPTIMIZATION

CROSS-REFERENCE TO RELATED APPLICATIONS

This application claims priority under 35 USC §119(e) to U.S. Provisional Patent Application 60/778,766 filed 3 Mar. 2006, and to U.S. Provisional Patent Application 60/781,256 filed 10 Mar. 2006, the entirety of these applications being incorporated by reference herein.

FIELD OF THE INVENTION

This document concerns an invention relating generally to molecular spectrometry, and more specifically to signal quality improvement for molecular spectrometers, e.g., Raman spectrometers, UV-Vis (ultraviolet/visible spectrum) spectrometers, and other spectrometers.

BACKGROUND OF THE INVENTION

Figure 1:
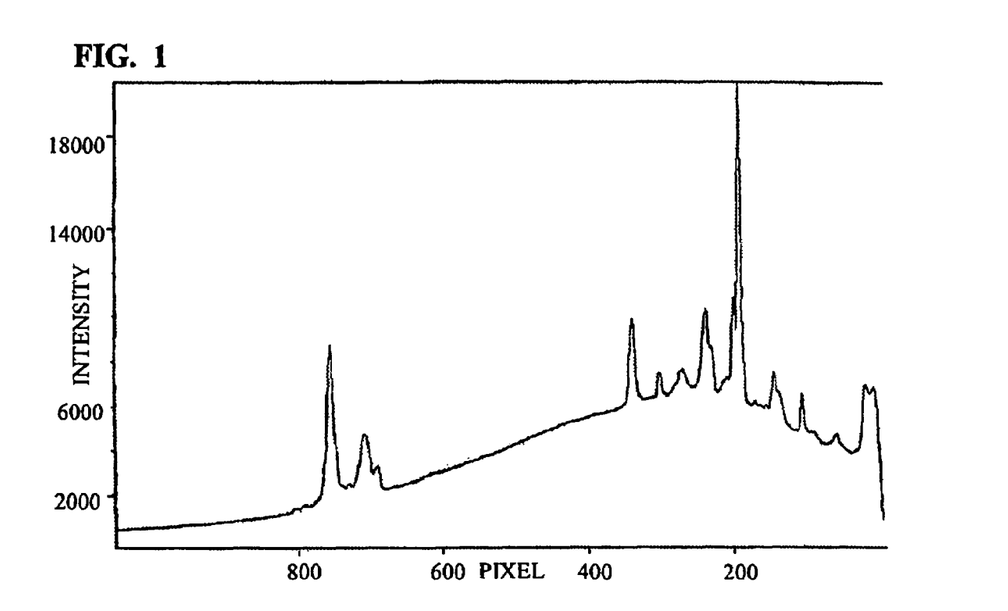
FIG. 1 depicts an exemplary spectrum collected from a sample by a Raman spectrometer.

Molecular spectrometry is a well-known technique used to identify the characteristics of gas, liquid, and solid samples, wherein light is directed at a sample and the light reflected from, scattered by, and/or transmitted through the sample is then picked up by a photosensitive detector to be analyzed for changes in wavelength. These changes may provide information regarding the composition of the sample, its chemical bonds, and other features. As an example, FIG. 1 illustrates an example of a spectrum (sometimes referred to as an "exposure," or simply a "reading") obtained from a Raman spectrometer, wherein a laser is directed at a sample and the detector captures data regarding the light scattered from the sample. Here the spectrum data is presented as a plot of light intensity versus light wavelength, with wavelength being represented by pixel numbers from the detector (which is made of an array of detector elements/pixels, such as an array of CCD elements). The spectrum, and in particular the locations and amplitudes of the "peaks" therein, can be compared to libraries of previously-obtained reference spectra to obtain information about the sample, such as its identity and characteristics.

One issue with spectra captured by molecular spectrometers, and in particular Raman spectrometers, is that the spectra can be difficult to interpret owing to weak signals (i.e., the "peaks" present in FIG. 1), and/or high noise (the "background" shown between the peaks). In general, the higher a spectrum's signal-to-noise ratio, the easier it is to match it to reference spectra or otherwise process/interpret the spectrum. To understand the factors affecting spectral signals and noise, it is useful to further examine how a spectrometer collects a spectrum. Typically, the detector element/pixel array is exposed to the light from the sample for a period of time (the "exposure time"), and then the accumulated/integrated charge on each element or pixel is converted into a digital signal (which can then be presented in a form similar to FIG. 1, if desired). This signal at each pixel is typically proportional to the light intensity thereon, but the signal is subject to both systematic and random errors, giving rise to the background noise. One common systematic error is dark current, which is a steady accumulation of charge on an element/pixel even when there is no incident light on the pixel. Dark current is intrinsic to the operation of many photosensitive detectors, and thus is difficult or impossible to eliminate. Another common systematic error is electronic offset: each pixel's deviation from the sensitivity value that it was intended to have during manufacture. In other words, offset arises from variations in materials, manufacturing processes, and other factors which generate minor deviations from pixel to pixel, making certain pixels more sensitive than others. As for random errors, these can arise for many reasons, with a common example being cosmic rays: ambient charged particles which periodically strike a pixel and give rise to a transient, but often high, intensity reading at the pixel in question. These systematic and random errors are unique to each array pixel, and they combine to contribute to the noise (which is often referred to as the "background" or "background spectrum," though it contains no true spectral data).

To reduce the effect of these errors, it is common to employ a "background subtraction" scheme. After the spectrometer captures an exposure (i.e., provides light to the detector to collect spectra from a sample), the detector is shuttered or otherwise isolated so that data can be collected from the detector without having any light incident thereon. Such data provide a background spectrum which should (ideally) reflect the systematic component of the background in a sample exposure, provided the sample exposure and the background exposure had the same exposure time. One can then compensate for the random component of the background by taking several background exposures (again ideally having the same exposure time) and combining them by averaging or similar methods, or otherwise processing them to remove aberrational pixel intensities. Pixel-by-pixel subtraction of the combined background exposures from the sample spectra can then assist in reducing the background.

In similar respects, it is also useful to collect several exposures from a sample, all having the same exposure time, and then combining the collected spectra (e.g., by averaging or simply summing them). The resulting combined spectrum diminishes the effect of random noise and exhibits an improved signal-to-noise ratio relative to the individual component spectra. The aforementioned background subtraction scheme can then be applied to the combined spectrum to further enhance the signal to noise ratio.

However, both background subtraction and spectral combination bear disadvantages. In both cases, the methods for combining the spectra—as by averaging the sample exposures and/or background exposures—take a significant amount of time owing to the need to collect multiple exposures. From the standpoint of the spectrometer operator, this represents time that the spectrometer is unavailable for use. With respect to backgrounds, a combined background could be generated once and stored for subsequent use, but it is unique to the sample exposure time selected by the spectrometer operator. Thus, to use a combined background which has been stored in advance, an operator is limited to use of sample exposure times equivalent to the background exposure times used for the component backgrounds of the combined background. For reasons discussed below, it is undesirable to be limited to a particular sample exposure time. Thus, if the operator wants to change the sample exposure time, a new background (or backgrounds) having the same exposure time must be collected.

Better signal to noise ratios can also be obtained by increasing the exposure time. However, there are practical limits on exposure time. Initially, if one increases sample exposure time, the background exposure time must be increased to match in order to subsequently achieve proper subtraction (as discussed above). The aggregate time to reach the final "noise-cleaned" spectrum is further increased if the aforementioned combination methods are used (e.g., averaging, summing, or similar methods), since the multiple sample exposures and/or background exposures used to make the combination—which, again, should have the same exposure time—lead to a geometric increase in overall time. Further, a specified exposure time may be too large for the sample being measured: the strength of the signals (the height of the peaks) can exceed the capacity of the spectrometer electronics, resulting in an overflow condition and an invalid spectrum. The spectrometer operator is then required to reduce the exposure time and repeat the measurement, leading to even further lost time.

SUMMARY OF THE INVENTION

The invention, which is defined by the claims set forth at the end of this document, is directed to methods and systems which at least partially alleviate the aforementioned problems, and assist in the ability to generate spectra with improved signal to noise ratios. To give the reader a basic understanding of some of the advantageous features of the invention, following is a brief summary of preferred versions of the invention. Since this is merely a summary, it should be understood that more details regarding the preferred versions may be found in the Detailed Description set forth elsewhere in this document. The claims set forth at the end of this document then define the various versions of the invention in which exclusive rights are secured.

Initially, the invention provides methods and systems which allow the time needed for collection of background exposures to be greatly reduced, or even effectively eliminated, by collecting background exposures during the spectrometer's "idle time"—the time when the spectrometer is powered up, but is not collecting spectra from a sample. To operate a conventional spectrometer, an operator must first power it up (turn it on and otherwise place its components in condition to collect data from the detector), and then instruct the spectrometer to collect one or more spectra from a sample over a data collection time. This data collection time is generally equal to the exposure time, or the sum of the exposure times, specified by the operator or the spectrometer settings. The remaining time while the spectrometer is powered up is the idle time; in other words, powered time−data collection time=idle time. Ordinarily, the background exposure(s) must be collected during idle time occurring after the data collection time, since the sample exposure time must be known in order to take background exposures having the same exposure time. However, in the invention, background readings may be taken during background exposure times occurring within the idle time before and/or after the data collection time, and also they need not have the same duration as the sample exposure time (and preferably do not have the same duration, at least for some of the background readings). Most preferably, the background exposure times vary between at least some of the detector background readings, as by cycling through a range of background exposure times which vary within and/or about some range of conventional sample exposure times. The background readings at each element/pixel of the detector are then stored for each of the background exposure times. These background readings are preferably taken continuously, or nearly so, during the entire idle time while the spectrometer is powered. An example of this process is illustrated schematically in FIG. 2A, wherein a timeline is shown along a time axis t, with idle times I and a data collection time DC being shown along the time axis. During the idle time I, the spectrometer repeatedly collects background readings $N_1, N_2, \ldots, N_n$ having varying exposure times $Tb_1, Tb_2, \ldots, Tb_n$. This is also depicted in the process diagram of FIG. 2B at 200.

Figure 2A:
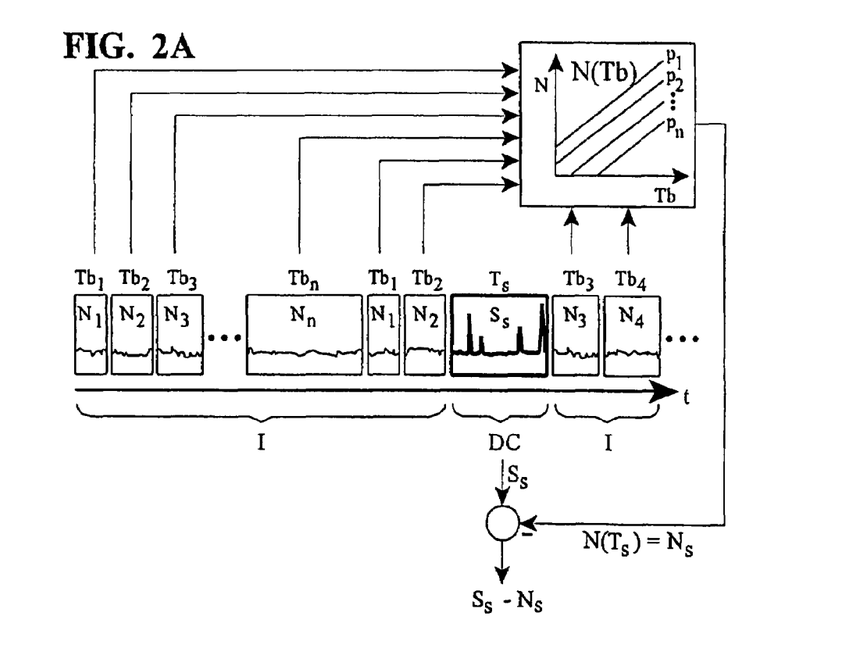
FIG. 2A is a diagram schematically depicting the background subtraction process of the invention, wherein background readings $N_1, N_2, \ldots, N_n$ having varying exposure times $Tb_1, Tb_2, \ldots, Tb_n$ are collected during idle times I along a timeline t and used to derive a function N=f(Tb), a sample reading $S_s$ having sample exposure time $T_s$ is collected during a data collection time DC, and a background reading $N_s$ corresponding to the sample exposure time $T_s$ is calculated from $N_s=N(T_s)$, with the calculated background reading then being subtracted from the sample reading $S_s$ to at least partially remove the background.

At some point, the operator will have the spectrometer collect a spectrum from a sample, or perhaps multiple spectra in the event where combination of the sample spectra is desired (in which case the sample spectra will have the same sample exposure time). In FIG. 2A, the collection of the spectrum is depicted by the sample spectrum $S_s$ having sample exposure time $T_s$ (a step which is also presented in FIG. 2B at 210).

To remove the background from the sample spectrum $S_s$, a reference background reading $N_s$ may then be generated from the collected background readings $N_1, N_2, \ldots, N_n$ and their background exposure times $Tb_1, Tb_2, \ldots, Tb_n$. This reference background reading $N_s$ is not truly a reading in the sense that it is not directly collected from the detector, and is rather an artificial/predicted value corresponding to a collected background reading N occurring at a background exposure time Tb which is at least substantially equal to the sample exposure time $T_s$. This is schematically depicted in FIG. 2A by the function N(Tb), which consists of the various background readings N collected at the various background exposure times Tb for each of the detector elements/pixels $p_1, p_2, \ldots, p_n$ (also see step 220 in FIG. 2B). The reference background reading $N_s$ may be generated from N(Tb), as at step 230 in FIG. 2B, by looking up the background reading N corresponding to the sample exposure time $T_s$ at each element/pixel of the detector. More preferably, since there may not be a previously collected background reading N having a background exposure time Tb precisely corresponding to the sample exposure time $T_s$, the reference background reading $N_s$ is obtained by extrapolating from the previously collected background readings N at each pixel. For example, the function N(Tb) representing the reference background reading vs. exposure time relationship can be derived from the collected background readings at each element/pixel by use of regression methods, and the sample exposure time $T_s$ can be used in the derived function N(Tb) to obtain the reference background reading $N_s$ at each element/pixel.

The reference background reading $N_s$ can then be subtracted from the sample spectrum $S_s$ (as at step 240 in FIG. 2B) to obtain a sample spectrum with background noise at least partially removed, and thereby having an improved signal to noise ratio. This "noise-cleaned" spectrum may then be stored, displayed, or otherwise used (step 250 in FIG. 2B). Since the invention collects background readings N during the idle time I with a variety of background exposure times Tb, rather than being limited to collecting background readings N only after the data collection time DC, and only having the same exposure time Tb as the sample exposure $T_s$, the speed of data collection and the generation of the final spectrum is substantially enhanced.

The invention also involves methods and systems for collecting spectra having a desired signal to noise ratio, with the desired signal to noise ratio being achieved by the appropriate tailoring of the sample exposure time, and/or of the number of sample exposures to be combined to acquire the final spectrum (which may then be subjected to the background subtraction method discussed above, if desired, to further enhance the effective signal to noise ratio). A preferred version of these spectral collection methods is outlined in the flowchart of FIGS. 3A and 3B, and will now be briefly reviewed.

Figure 3A:
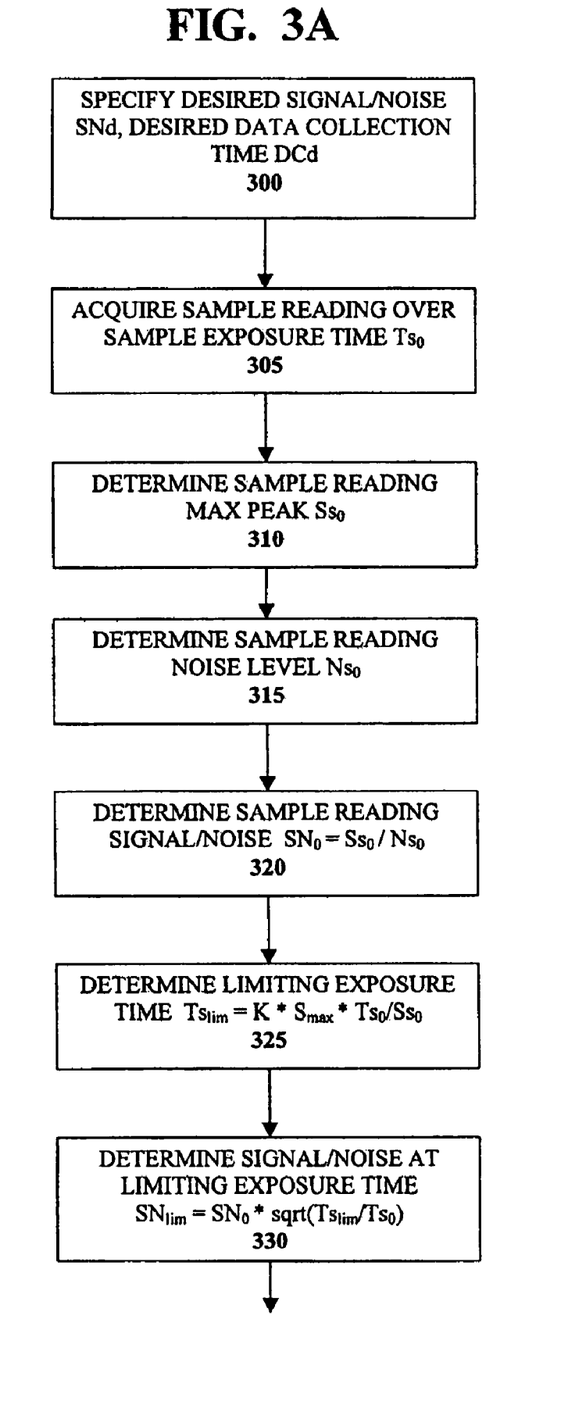
FIGS. 3A and 3B are respectively first and second portions of a process diagram illustrating exemplary steps of the spectral collection method discussed above, wherein a spectrum may be generated which has the desired signal to noise ratio SNd (and the desired data collection time DCd, if the spectrometer operator wishes) by collecting some number of sample readings $N_{exp}$, each having a sample exposure time of $Ts_{lim}$.

Initially, a sample reading is collected over a sample exposure time $Ts_0$, which is preferably short (FIG. 3A, step 305). The sample reading is then analyzed to determine its signal to noise ratio $SN_0$, as by identifying the peak in the sample spectrum having greatest magnitude ($Ss_0$), determining the overall magnitude of the spectrum with the peaks absent ($Ns_0$, i.e., the magnitude of the background noise), and calculating the ratio $SN_0=Ss_0/Ns_0$ (FIG. 3A, steps 310, 315, and 320).

A limiting exposure time $Ts_{lim}$ is then calculated, with $Ts_{lim}$ representing the greatest exposure time that can be handled by the spectrometer without overflow (or high risk of overflow). Here, as shown at step 325 of FIG. 3A, if Smax is the maximum signal level that can be properly handled by the spectrometer, it can be assumed that $Ts_{lim}/Smax$ is at least substantially proportional to $Ts_0/Ss_0$, and thus:

$$Ts_{lim}=K*Smax*Ts_0/Ss_0 \text{ (with } 0<K<1)$$

Here, K can be regarded as a "scaling factor" which can help avoid saturation of the spectrometer as the value of K decreases below 1.

The limiting exposure time $Ts_{lim}$ is then used to calculate a limiting signal to noise ratio $SN_{lim}$, wherein $SN_{lim}/sqrt(Ts_{lim})$ is presumed to be at least substantially proportional to $SN_0/sqrt(Ts_0)$. As shown in step 330 of FIG. 3A, $SN_{lim}$, which represents the signal to noise ratio expected for a sample exposure time of $Ts_{lim}$, is preferably approximated by:

$$SN_{lim}=SN_0*sqrt(Ts_{lim})/sqrt(Ts_0)$$

The next steps differ depending on whether the signal to noise ratio SNd desired by the spectrometer operator is greater or less than $SN_{lim}$ (with SNd usually being specified/known by the spectrometer operator at the outset of the process, as shown at step 300 of FIG. 3A). If SNd is greater than or equal to $SN_{lim}$, then it is known that SNd cannot be achieved with a single sample reading having an exposure time of $Ts_{lim}$. As shown at steps 335 and 340, the number of sample readings $N_{exp}$ that need to be acquired to attain SNd, assuming each sample reading has exposure time $Ts_{lim}$, can be approximated as:

$$Nexp=(SNd/SN_{lim})^2$$

If Nexp is not substantially equal to an integer value, it is rounded to an integer value, most preferably by rounding down to the closest integer.

Figure 3B:
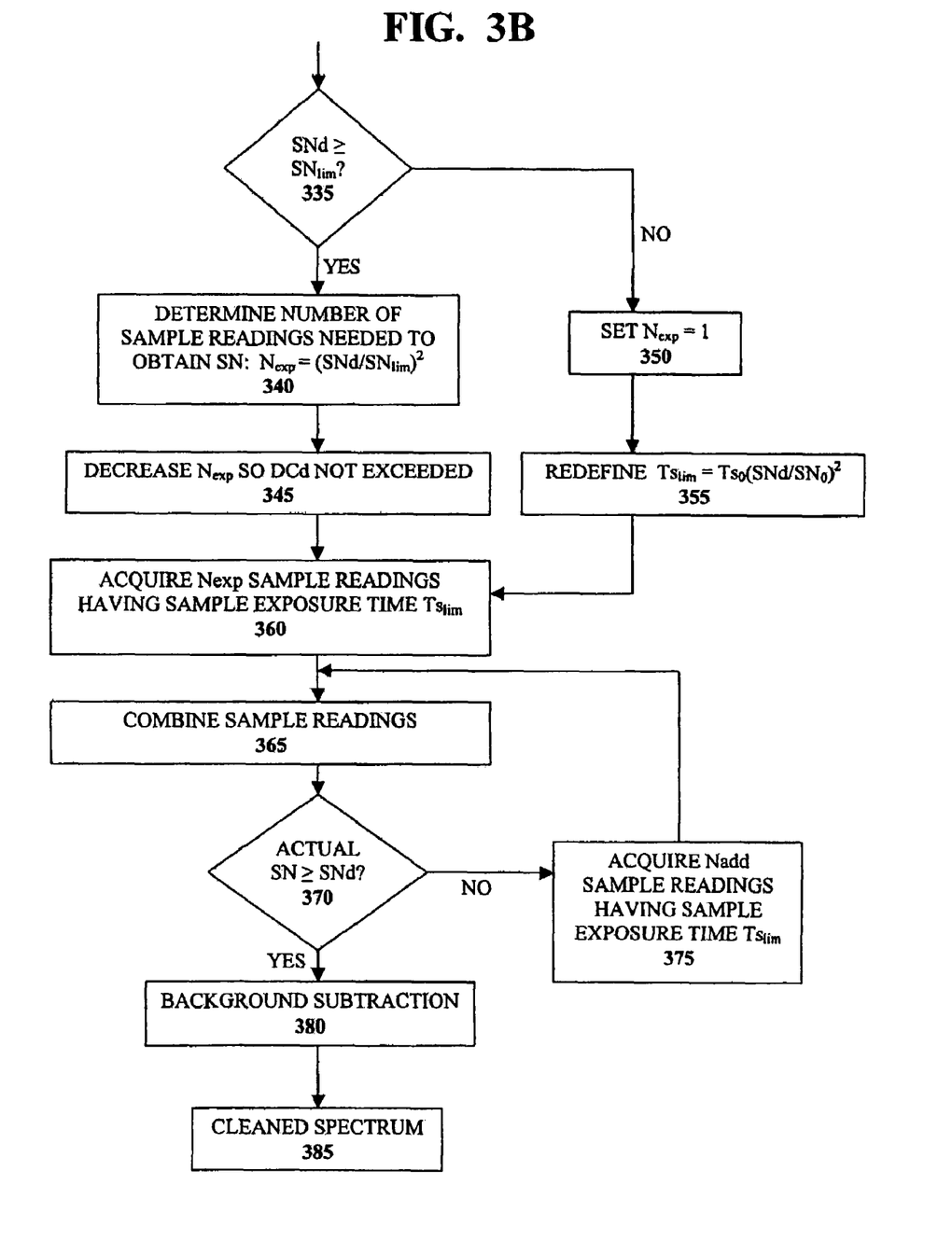

On the other hand, if SNd is less than $SN_{lim}$, only a single sample reading (Nexp=1) having an exposure time of $Ts_{lim}$ should be sufficient to achieve a signal to noise ratio greater than or equal to SNd (steps 335 and 350 of FIG. 3B). If it is desired to achieve a signal to noise ratio which closely approximates SNd rather than exceeding it, a new $Ts_{lim}$ can be calculated by assuming that SNd/sqrt(Td) is at least substantially proportional to $SN_0/sqrt(Ts_0)$, where Td is the exposure time predicted to yield the desired signal to noise ratio, and then solve for Td (and reset $Ts_{lim}$ to this value). A preferred way to apply this relationship, as shown in step 355 of FIG. 3B), is to assume:

$$Ts_{lim}=Ts_0(SNd/SN_0)^2$$

and a single sample reading (Nexp=1) can then be taken with a sample exposure time of $Ts_{lim}$.

The Nexp sample readings can then be collected (step 360 of FIG. 3B), with each reading having an exposure time at least substantially equal to $Ts_{lim}$, and can be combined by averaging, summing, or other combination methods to obtain a combined spectrum (step 365 of FIG. 3B). The resulting combined spectrum should have a signal to noise ratio at or approximating the desired signal to noise ratio SNd. If it should be found that the combined spectrum has a signal to noise ratio less than the desired signal to noise ratio SNd, as shown at steps 370 and 375, some number Nadd of additional sample readings can be taken (again with each having a sample exposure time of $Ts_{lim}$) until their combination Nexp+ Nadd has a signal to noise ratio suitably approximating the desired signal to noise ratio SNd.

The spectral collection method can also accommodate an operator's specification of a desired data collection time DCd (e.g., a maximum allowable data collection time), and can adapt the readings to fit within this time. If $Nexp*Ts_{lim}$—which is the nominal data collection time—exceeds DCd, Nexp can be redefined as an integer less than or equal to $DCd/Ts_{lim}$ (step 345 in FIG. 3A). (If it is acceptable to slightly exceed DCd, Nexp can be redefined as $DCd/Ts_{lim}$ rounded up to the next higher integer.) On the other hand, if $Nexp*Ts_{lim}$ is less than DCd, additional sample readings may be taken within the remaining time $DCd-(Nexp*Ts_{lim})$.

If desired, the background subtraction method discussed above can then be applied to the final combined sample spectrum. In this respect, it is notable that the background subtraction method is very well suited for use with the spectral collection method, and the methods provide a synergistically beneficial result when used together: since the spectral collection method results in some sample exposure time $Ts_{lim}$ which was initially unknown, as a practical matter, one cannot collect background readings having an exposure time equal to $Ts_{lim}$ beforehand. Thus, the background subtraction method can be applied, with $N(Ts_{lim})$ being calculated at each element/pixel of the detector and being subtracted from the final combined sample spectrum to "clean" it of background noise, without the need to collect background readings (or to exceed any operator-specified data collection time DCd).

Further advantages, features, and objects of the invention will be apparent from the remainder of this document in conjunction with the associated drawings.

DETAILED DESCRIPTION OF PREFERRED VERSIONS OF THE INVENTION

Expanding on the discussion above, in the background subtraction method, it is preferable to collect background readings almost constantly while the spectrometer is on, save for during the times when sample readings are being collected from samples. The controls of most spectrometers can be reprogrammed or otherwise adapted to implement this collection scheme, with the Nicolet Almega spectrometer (Thermo Scientific, Madison, Wis., USA) being an example of a spectrometer which can be beneficially adapted to execute the background subtraction method (as well as the spectral collection method). Thus, the invention may be provided in the form of software, or in firmware/hardware form, e.g., in the form of an Application Specific Integrated Circuit (ASIC) for use in performing spectrometer control functions.

The foregoing discussion notes that the background readings N are preferably collected by continuously cycling through ranges of background exposure times Tb. FIG. 2A depicts the background exposure times $Tb_1, Tb_2, \ldots, Tb_n$ starting at some minimum background exposure time $Tb_1$, and then being incrementally increased until some maximum background exposure time $Tb_n$ is reached, at which point the cycle begins again with a background reading having duration $Tb_1$. A cycle starting with some maximum $Tb_1$, and ending with a minimum $Tb_n$, is also possible, as are oscillating cycles wherein the background exposure times Tb continuously increase and decrease about some average value (i.e., Tb increases from a minimum to a maximum, and then decreases to the minimum again, followed by another increase to the maximum, etc.). Another possibility is to have background exposure times Tb oscillate with increasing amplitude about an average value whish is set equal to the last sample exposure time used by the spectrometer—in other words, a cycle could start with a mean background exposure time $Tb_1$ equal to the last sample exposure time $T_s$ used by the spectrometer, then have $Tb_2$ slightly increase above $Tb_1$, then have $Tb_3$ decrease to a value less than $Tb_1$, then have $Tb_4$ increase to a value greater than $Tb_2$, then $Tb_5$ is less than $Tb_3$, and so forth. It is also possible to have background exposure times Tb simply randomly vary within some desired range. All of these are merely examples, and it should be understood that other variations are possible.

In similar respects, it should be understood that the sample reading $S_s$—or sample readings $S_{s1}, S_{s2}, \ldots, S_{sn}$ for possible later combination—may occur at any desired times along the timeline t. In the example of FIG. 2A, the collection of the sample reading $S_s$ occurs after background reading $N_2$, and before background reading $N_3$, within the second cycle of background readings simply because this is when the operator instructed the spectrometer to take a reading from the sample. The data collection time DC, and the sample reading (or readings) therein, can occur after and/or prior to the collection of any background readings. It is also possible that multiple sample readings which are intended for combination could be interrupted by background readings, in other words, that the data collection time DC could be interrupted by background readings.

It should also be understood that N(Tb), i.e., the reference background reading vs. exposure time relationship, could use the most recently stored background readings $N_1, N_2, \ldots, N_n$ (e.g., only those background readings which were collected during the idle time since the spectrometer was last turned on). Alternatively, N(Tb) could use background readings from several or all prior cycles, as by combining (e.g., averaging) all background readings N having the same background exposure times Tb that were collected since the spectrometer went into service. In such an arrangement, the reference background reading vs. exposure time relationship N(Tb) could be periodically "refreshed" to compensate for the possibility of detector drift. For example, the spectrometer could periodically discard older collected background readings, and rederive N(Tb) using more recent collected background readings and their background exposure times. As these examples illustrate, a variety of background collection schemes are possible, and it should be understood that yet other schemes could be used, with their choice perhaps being discretionary on the part of the spectrometer operator.

In FIG. 2A, N(Tb) at each element/pixel $p_1, p_2, \ldots, p_n$ is depicted as being linear. It has been found that a linear N(Tb) does work adequately in most circumstances, at least for the aforementioned Nicolet Almega spectrometer mentioned above. However, N(Tb) is not strictly linear, particularly at lower background exposure times Tb. It is therefore preferred to represent N(Tb) by an exponential relationship or by an nth-order polynomial curve-fit (with a quadratic fit being found to work well).

Additionally, the foregoing discussion assumes that the temperature of the detector—which has a strong impact on dark current—is held constant during collection of the background readings and sample reading(s). If the detector temperature DT is allowed to vary, it may be necessary to model N as a function of both background reading exposure time Tb and of detector temperature DT, i.e., N=f(Tb, DT)=N(Tb, DT). As more background readings with different exposure times and detector temperatures are stored, the spectrometer's ability to estimate background noise at different sample reading times and detector temperatures should increase. The noise model N=f(Tb) (or N=f(Tb, DT)) could accommodate other parameters apart from Tb and/or DT, if desired.

Figure 2B:
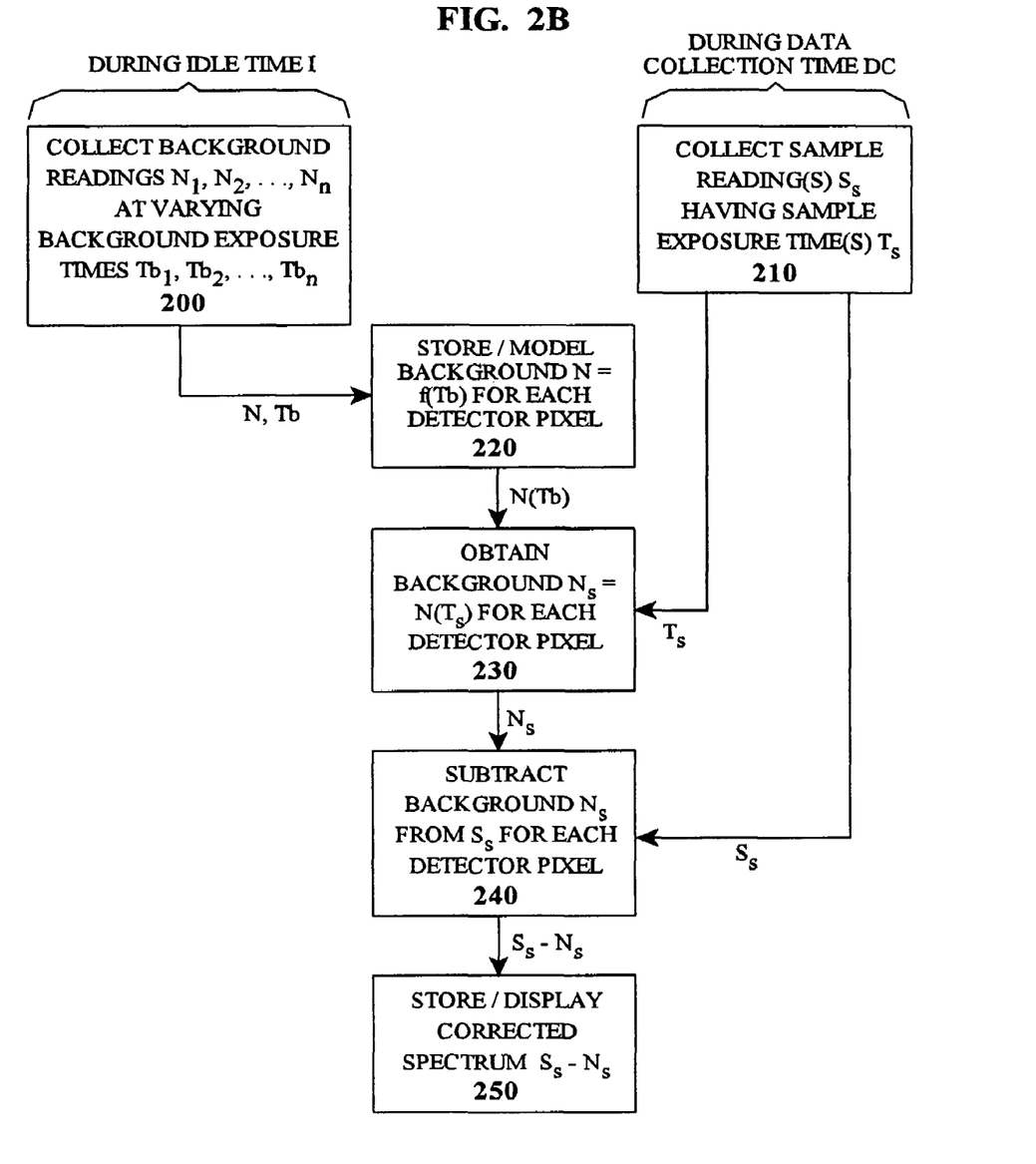
FIG. 2B is a process diagram further depicting the background subtraction process of FIG. 2A.

FIG. 2B implies that processing steps 220, 230, 240, and 250 occur outside of the idle time I when background readings are collected, and outside of the data collection time DC when one or more sample readings are collected. It should here be understood that these steps may occur simultaneously with one or both of the idle time I and/or the data collection time DC, and could occur simultaneously with the collection of readings and/or at other times. In other words, the processing steps 220, 230, 240, and 250 can occur at any desired time, subject only to the data processing limitations of the spectrometer (and/or any associated data processing equipment).

The background subtraction method offers significant benefits for spectrometer operation, regardless of whether it is used with the spectral collection method or otherwise. As previously noted, the value of the spectral collection method is enhanced when used in combination with the background subtraction method, since the spectral collection method results in some sample exposure time $Ts_{lim}$ which was previously unknown, and therefore one cannot collect background readings having the same exposure time beforehand. Use of the background subtraction method allows background readings to be rapidly generated regardless of what value of $Ts_{lim}$ results. Even where the background subtraction method is not used with the spectral collection method, it still offers the advantage that it eliminates the inconvenience of waiting for background reading collection during routine use of a spectrometer. Also, a typical spectrometer spends significant time in an idle state, and the background subtraction method uses this time to collect multiple sets of background readings, which in turn helps reduce random noise in the subtracted background spectrum. This is significant because random noise in the background spectrum multiplies the overall noise of the subtracted spectrum by the square root of 2, or roughly 40%. If sufficient sets of background readings are collected, the random noise contribution from the background can be rendered insignificant, providing an effective sensitivity gain for the spectrometer.

Turning to the spectral collection method of FIGS. 3A and 3B, this may be used to determine the number of sample readings Nexp needed with sample exposure time $Ts_{lim}$ in order to obtain a desired signal to noise ratio SNd, either with or without consideration of some desired data collection time DCd (e.g., a maximum data collection time). In similar respects, it is also possible to use the principles of the spectral collection method to collect some number of sample readings Nexp having sample exposure times $Ts_{lim}$ wherein signal to noise ratios are maximized, and wherein these sample readings meet any constraints imposed by any desired data collection time DCd. Here, steps 305-325 of FIG. 3A can be followed to obtain a limiting exposure time $Ts_{lim}$, and then Nexp sample readings can be collected, wherein Nexp is an integer equal to or approximating $DCd/Ts_{lim}$ (and wherein each reading is collected over an exposure time at least substantially equal to $Ts_{lim}$).

In both the background subtraction and spectral collection methods, the steps of these methods are not in all cases limited to the orders implied in the accompanying Figures. As examples, the data collection time DC could occur prior to the idle time I shown in FIG. 2A, and the specification of the desired signal to noise ratio SNd need not occur at the outset of the method as shown in FIG. 3A. Thus, it should be understood throughout this document, and particularly in the claims set forth below, that the steps of the methods need not occur in the order in which they are set forth unless they are limited to a particular sequence by language or necessity.

The foregoing background subtraction and spectral collection methods are particularly useful in Raman spectrometers, spectrometers operating in the ultraviolet and/or visible light ranges (e.g., UV-Vis spectrometers), and other spectrometers which tend to use integrating detectors (i.e., detectors having elements which integrate charge over time). However, the methods can be extended to other types of spectrometers as well, so long as the aforementioned steps are adapted to the spectrometer in question. As an example, the spectral collection method can be applied to in a Fourier Transform Infrared (FT-IR) spectrometer, but here ADC (Analog to Digital Converter) input gain and number of scans—which are respectively analogous to exposure time and number of exposures—might be used.

The invention is not intended to be limited to the preferred versions described above, but rather is intended to be limited only by the claims set out below. Thus, the invention encompasses all different versions that fall literally or equivalently within the scope of these claims.

What is claimed is:

1. A method for using a spectrometer to collect spectra having an improved signal to noise ratio, the method comprising the steps of:
   a) providing a desired signal to noise ratio SNd for spectra to be collected by the spectrometer;
   b) providing a spectrum from the spectrometer, the spectrum having:
      (1) an exposure time $Ts_0$;
      (2) a signal level $Ss_0$;
      (3) a noise level Ns0;
      (4) a signal to noise ratio $SN_0 = Ss_0/Ns0$;
   c) providing the maximum signal level Smax allowed by the spectrometer;
   d) calculating a limiting exposure time $Ts_{lim}$ for the spectrometer, wherein $Ts_{lim}$ is approximated by or equal to $K*Smax*Ts_0/Ss_0$ (with 0<K<1);
   e) calculating a limiting signal to noise ratio $SN_{lim}$, wherein $SN_{lim}$ is approximated by or equal to $SN_0*sqrt(Ts_{lim})/sqrt(Ts_0)$;
   f) where SNd is less than $SN_{lim}$:
      (1) adjusting the limiting exposure time $Ts_{lim}$, wherein $Ts_{lim}$ is approximated by or equal to $Ts_0*(SNd/Ss_0)^2$;
      (2) collecting Nexp spectra (with Nexp=1), each spectrum being collected over an exposure time approximated by or equal to $Ts_{lim}$.

2. The method of claim 1 further comprising the steps of:
   a) where SNd is greater than or equal to $SN_{lim}$, calculating a desired number of exposures Nexp, wherein Nexp is an integer at least substantially equal to $(SNd/SN_{lim})$ squared;
   b) collecting Nexp spectra, each spectrum being collected over an exposure time at least substantially equal to $Ts_{lim}$.

3. The method of claim 1 further comprising the steps of:
   a) providing a maximum collect time DCd over which spectra may be collected;
   b) if $Nexp*Ts_{lim}$ exceeds DCd, further comprising the step of redefining Nexp as an integer at least substantially equal to $DCd/Ts_{lim}$.

4. The method of claim 1 further comprising the steps of:
   a) providing a maximum collect time DCd over which spectra may be collected;
   b) if $Nexp*Ts_{lim}$ is less than DCd, further comprising the step of collecting at least one additional spectrum, each spectrum being collected over an exposure time at least substantially equal to $Ts_{lim}$.

5. The method of claim 1 further comprising the steps of:
   a) combining the Nexp spectra; and
   b) if the combined spectrum has a signal to noise ratio less than the desired signal to noise ratio SNd, collecting at least Nadd additional spectra (wherein N>=1);
   c) combining the Nexp+Nadd spectra.

6. A method for using a spectrometer to collect spectra having an improved signal to noise ratio, the method comprising the steps of:
   a) providing a desired signal to noise ratio SNd for spectra to be collected by the spectrometer;
   b) providing a spectrum from the spectrometer, the spectrum having:
      (1) an exposure time $Ts_0$;
      (2) a signal level $Ss_0$;
      (3) a noise level Ns0;
      (4) a signal to noise ratio $SN_0 = Ss_0/Ns0$;
   c) providing the maximum signal level Smax allowed by the spectrometer;
   d) calculating a limiting exposure time $Ts_{lim}$ for the spectrometer, wherein $Ts_{lim}$ is approximated by or equal to $K*Smax*Ts_0/Ss_0$ (with 0<K<1);
   e) calculating a limiting signal to noise ratio $SN_{lim}$, wherein $SN_{lim}$ is approximated by or equal to $SN_0*sqrt(Ts_{lim})/sqrt(Ts_0)$;
   f) where SNd is greater than or equal to $SN_{lim}$:
      (1) calculating a desired number of exposures Nexp, wherein Nexp is an integer at least substantially equal to $(SNd/SN_{lim})$ squared;
      (2) collecting Nexp spectra, each spectrum being collected over an exposure time at least substantially equal to $Ts_{lim}$.

7. The method of claim 6 further comprising the steps, where SNd is less than $SN_{lim}$, of:
   a) adjusting the limiting exposure time $Ts_{lim}$, wherein $Ts_{lim}$ is approximated by or equal to $Ts_0*(SNd/Ss_0)^2$;
   b) collecting Nexp spectra (with Nexp=1), each spectrum being collected over an exposure time approximated by or equal to $Ts_{lim}$.

8. The method of claim 6 further comprising the steps of:
a) providing a maximum collect time DCd over which spectra may be collected;
b) if $Nexp*Ts_{lim}$ exceeds DCd, further comprising the step of redefining Nexp as an integer at least substantially equal to $DCd/Ts_{lim}$.

9. The method of claim 6 further comprising the steps of:
a) providing a maximum collect time DCd over which spectra may be collected;
b) if $Nexp*Ts_{lim}$ is less than DCd, further comprising the step of collecting at least one additional spectrum, each spectrum being collected over an exposure time at least substantially equal to $Ts_{lim}$.

10. The method of claim 6 further comprising the steps of:
a) combining the Nexp spectra; and
b) if the combined spectrum has a signal to noise ratio less than the desired signal to noise ratio SNd, collecting at least Nadd additional spectra (wherein N>=1);
c) combining the Nexp+Nadd spectra.

11. A method for using a spectrometer to collect spectra having an improved signal to noise ratio, the method comprising the steps of:
a) collecting a sample spectrum over a sample exposure time $Ts_O$;
b) determining a signal to noise ratio $SN_O$ in the sample spectrum;
c) calculating a limiting exposure time $Ts_{lim}$ wherein:
  (1) Smax is the maximum signal level allowed by the spectrometer, and
  (2) $Ts_{lim}/Smax$ is at least substantially proportional to $Ts_O/Ss_O$, wherein $Ss_O$ is the strongest signal within the sample spectrum;
d) calculating a limiting signal to noise ratio $SN_{lim}$, wherein $SN_{lim}/sqrt(Ts_{lim})$ is presumed to be at least substantially proportional to $SN_O/sqrt(Ts_O)$;
e) for a desired signal to noise ratio SNd, if:
  (1) SNd is greater than or equal to $SN_{lim}$, calculating a desired number of exposures Nexp, wherein Nexp is an integer at least substantially equal to $(SNd/SN_{lim})^2$;
  (2) SNd is less than $SN_{lim}$:
    (a) recalculating the limiting exposure time $Ts_{lim}$, wherein $SNd/sqrt(Ts_{lim})$ is presumed to be at least substantially proportional to $Ss_O/sqrt(Ts_O)$, and
    (b) setting Nexp=1;
f) collecting Nexp spectra, each spectrum being collected over an exposure time at least substantially equal to $Ts_{lim}$.

12. The method of claim 11 wherein:
a) a maximum collect time DCd is specified over which spectra may be collected, and
b) wherein if $Nexp*Ts_{lim}$ exceeds DCd, Nexp is redefined as an integer less than or equal to $DCd/Ts_{lim}$.

13. The method of claim 11:
a) wherein a maximum collect time DCd is specified over which spectra may be collected, and
b) if $Nexp*Ts_{lim}$ is less than DCd, further comprising the step of collecting at least one additional spectrum, each spectrum being collected over an exposure time at least substantially equal to $Ts_{lim}$.

14. The method of claim 11:
a) wherein a maximum collect time DCd is specified over which spectra may be collected, and
b) wherein if $Nexp*Ts_{lim}$:
  (1) exceeds DCd, Nexp is redefined as an integer less than or equal to $DCd/Ts_{lim}$;
  (2) is less than DCd, further comprising the step of collecting at least one additional spectrum, each spectrum being collected over an exposure time at least substantially equal to $Ts_{lim}$.

15. The method of claim 11 further comprising the steps of:
a) combining the Nexp spectra; and
b) if the combined spectrum has a signal to noise ratio less than the desired signal to noise ratio SNd, collecting at least one additional spectrum.

16. The method of claim 15 wherein if the combined spectrum has a signal to noise ratio less than the desired signal to noise ratio SNd, spectra are collected until their combination has a signal to noise ratio approximating the desired signal to noise ratio SNd.

17. The method of claim 11 wherein the step of determining the signal to noise ratio $SN_O$ in the sample spectrum comprises the steps of:
a) identifying peaks in the sample spectrum;
b) determining the magnitude of the greatest peak;
c) determining the overall magnitude of the spectrum with the peaks absent;
d) determining the ratio of the magnitude of the greatest peak to the overall magnitude of the spectrum with the peaks absent.

18. The method of claim 11 further comprising the step of summing the Nexp spectra.

19. The method of claim 11 further comprising the step of averaging the Nexp spectra.

* * * * *